United States Patent [19]

Röntgen

[11] Patent Number: 5,072,824
[45] Date of Patent: Dec. 17, 1991

[54] ENDLESS CHAIN FOR A TRAVELING WEB TRANSPORT ASSEMBLY OF A TEXTILE MACHINE

[75] Inventor: Manfred Röntgen, Mönchen-Gladbach, Fed. Rep. of Germany

[73] Assignee: A. Monforts GmbH & Co., Mönchen-Gladbach, Fed. Rep. of Germany

[21] Appl. No.: 527,284

[22] Filed: May 23, 1990

[30] Foreign Application Priority Data

May 23, 1989 [DE] Fed. Rep. of Germany ....... 3916714

[51] Int. Cl.⁵ .............................................. B65G 45/02
[52] U.S. Cl. ...................................... 198/500; 198/845
[58] Field of Search ...................... 198/838, 845, 500; 184/12, 15.1, 15.2, 61, 62

[56] References Cited

U.S. PATENT DOCUMENTS

| | | | |
|---|---|---|---|
| 2,685,361 | 8/1954 | Garman et al. | 198/845 X |
| 4,526,271 | 7/1985 | Finnighan | 198/845 X |
| 4,635,783 | 1/1987 | Hofling | 198/838 X |

FOREIGN PATENT DOCUMENTS

3529683A1 2/1987 Fed. Rep. of Germany .
3713063A1 11/1988 Fed. Rep. of Germany .

Primary Examiner—Joseph E. Valenza
Assistant Examiner—Keith L. Dixon
Attorney, Agent, or Firm—Shefte, Pinckney & Sawyer

[57] ABSTRACT

A traveling web transport assembly for transporting a web of textile material includes an endless chain having a plurality of web engaging members which engage one edge portion of the textile material web. The endless chain is formed with a plurality of cylindrical hub members each receiving a pin member therethrough. Each pin member is connected to an adjacent pin member by a pin link component and each hub member is connected to an adjacent hub member by a hub link component, the pin link components and the hub link components being arranged in alternating manner. A guide roller assembly mounted on each hub member includes an outer roller element rotatably supported on a ball bearing assembly. A lubrication conduit component includes a throughbore formed in a selected one of the hub and pin link components associated with each respective hub member and opening into the ball bearing assembly for introducing lubricant to the ball bearing assembly.

6 Claims, 1 Drawing Sheet

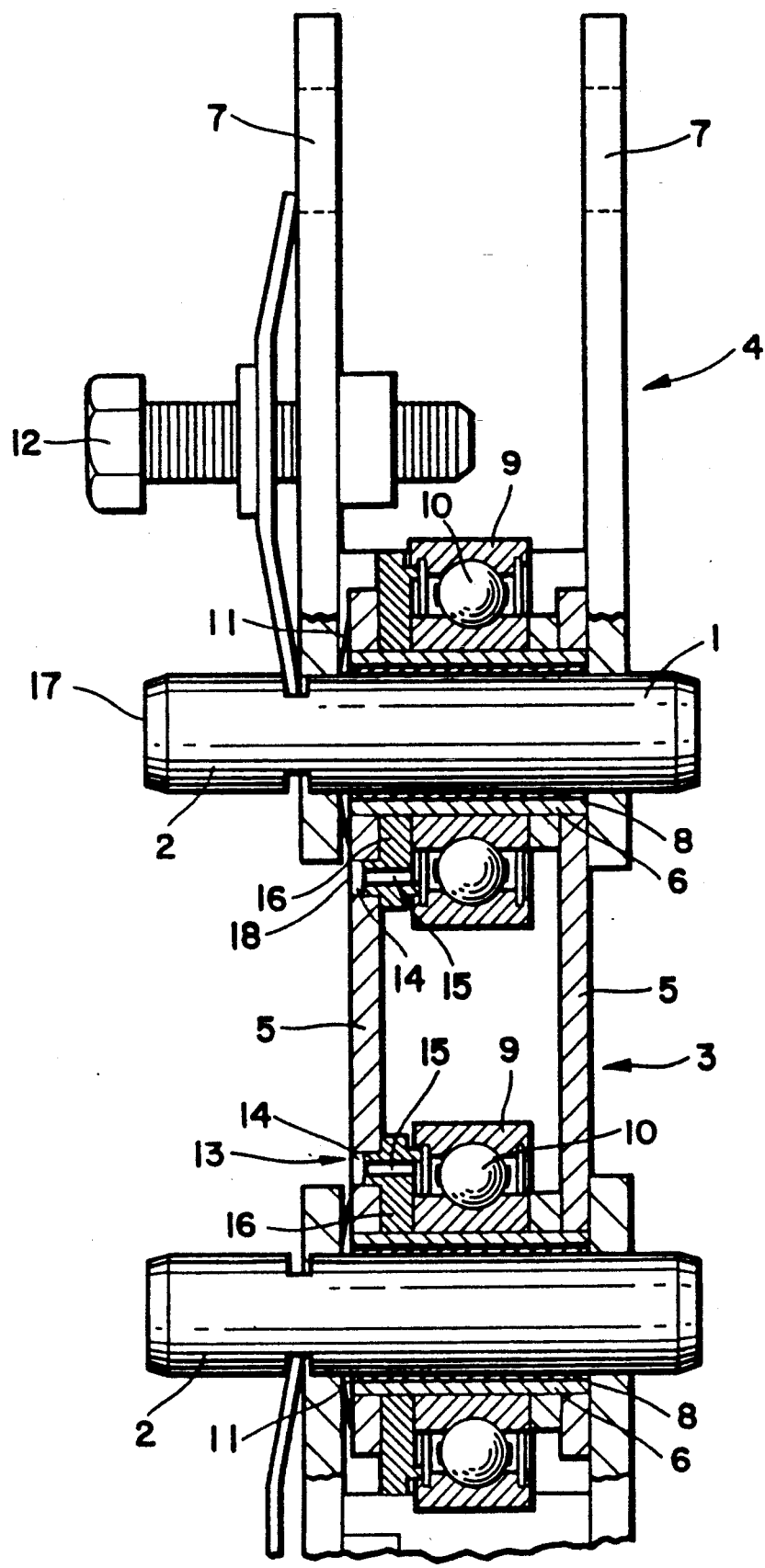

ENDLESS CHAIN FOR A TRAVELING WEB TRANSPORT ASSEMBLY OF A TEXTILE MACHINE

BACKGROUND OF THE INVENTION

The present invention relates to an endless chain for the traveling web transport assembly of a textile machine such as a tenter frame.

One known arrangement for transporting a web of textile material through a tenter frame includes a pair of assemblies that include a pair of spaced endless chains, each supporting a plurality of web engaging members, such as vertical needles, onto which one edge portion of the textile web is impaled. The assemblies include a plurality of hub members, each hub member receiving a pin member therein and connected by a link to an adjacent hub member, with each pin member connected by a link to an adjacent pin member so that the hub links and the pin links are arranged in an alternating manner.

To guide an endless chain during its travel, each hub member is typically provided with a guide roller element rotatably secured thereto concentric with the associated pin member. Each guide roller element includes a ball bearing assembly for permitting rotation of the guide roller element relative to the hub member within a roller track extending in the direction of travel of the endless chain. The guide roller elements and the roller track cooperate together to support the endless chain with respect to the force exerted thereon by the textile web in a direction transverse to the direction of movement of the endless chain.

The ball bearing assembly of each guide roller element must be cyclically lubricated during normal operations and, for this purpose, it is known to provide a lubrication arrangement including a bore extending axially in each pin member and a radial bore extending from each axial bore to the outer circumference of the pin member. Each hub member includes a bore extending radially with respect to the axis of the respective pin member received therein and generally aligned with the radial bore in the pin member. Additionally, if the hub member is provided with a bushing for rotatably supporting the pin member in the hub member, the bushing is also provided with a radial throughbore. Accordingly, lubricant can be introduced into the ball bearing assembly through the respective aligned bores in the pin member, the bushing and the hub member.

To facilitate efficient lubrication of the ball bearing assemblies, one known practice includes securing each hub member, bushing and pin member against movement relative to one another so that their respective bores remain in alignment. However, in such an arrangement, the bushing tends to be subjected to uneven wear during direction reversing movement of the endless chain about the drive rollers on which it is trained. Thus, the bushing tends to wear out quicker than if the wear were uniformly distributed. Accordingly, the need exists for an endless chain for a traveling hub transport assembly having a ball bearing assembly which is easily and reliably accessible for introducing lubricants thereto.

SUMMARY OF THE INVENTION

The present invention provides an endless chain for the traveling web transport assembly of a textile machine having a ball bearing assembly which is easily and readily accessible for introducing lubricants thereto.

Briefly described, the present invention includes an endless chain for a traveling web transport assembly of a textile machine of the type having a plurality of web engaging members mountable on an endless chain for movement therewith for engaging one edge portion of a web of textile material. The endless chain includes a plurality of hub members, each hub member having an open ended cylindrical chamber, and a plurality of spaced cylindrical pin members. Each pin member is disposed in one of the chambers for free rotation therein about the axis of the cylindrical chamber and each pin member projects beyond the ends of its associated chamber.

The endless chain additionally includes a plurality of spaced pin link components each interconnecting an adjacent pair of pin members and a plurality of spaced hub link components alternating with the spaced pin link components and each interconnecting an adjacent pair of hub members.

The endless chain further preferably includes guide roller means mounted to hub member. Each guide roller means includes an outer roller element and a ball bearing means movably supporting the outer roller element on the respective hub member for rotation about the respective chamber axis. The hub link component associated with each respective hub member is connected to the hub member at a location relative to the respective chamber axis intermediate the respective pin link component connected to the associated pin member within the respective chamber and the ball bearing means associated with the respective hub member.

The endless chain additionally preferably includes lubrication conduit means includes a conduit for introducing lubricant to each ball bearing means. The conduit preferably includes a throughbore formed in a selected one of the hub link component and the pin link component associated with the respective hub member and opening into the ball bearing means of the hub member.

According to one aspect of the present invention, each throughbore extends transversely with respect to a selected one of the hub link component and the pin link component. Also, each throughbore is formed in the hub link component associated with the respective hub member at a radial spacing from the associated pin link member.

According to a further aspect of the present invention, a selected one of the hub link component and the pin link component includes a pair of parallel, axially spaced outer link elements and the lubrication conduit means includes an intermediate member disposed between the outer link element and the ball bearing means. The conduit extends from the throughbore through the intermediate member and opens into the ball bearing means.

According to a different aspect of the present invention, the endless chain preferably includes an elastomeric closure means associated with each lubrication conduit means. Each elastomeric closure means includes a pair of spaced throughbores each adapted to be inserted over one pin member of an adjacent pair of pin members. The elastomeric closure means preferably extends between each adjacent pair of pin members in covering relation to the throughbore of the respective lubrication conduit means.

In yet a further aspect of the present invention, each conduit is inclined from the associated hub link component to the associated ball bearing means toward the associated pin member. The inclination of each conduit toward the associated pin member is preferably up to an angle of approximately 60° with respect to the axis of the respective chamber.

BRIEF DESCRIPTION OF THE DRAWINGS

The single drawing is a vertical longitudinal sectional view taken along the center line of an endless chain for a traveling web transport assembly of a textile machine according to the preferred embodiment of the present invention.

DETAILED DESCRIPTION OF THE PREFERRED EMBODIMENT

In the drawing, the endless chain of the present invention includes a plurality of hub members 6 each having an open end cylindrical chamber. A cylindrical conventional bushing 8 which may be formed, for example, of polytetraflorethylene material, is disposed in the cylindrical chamber of each hub member 6. A pin member 2 is disposed in each respective hub member 6 with the axis 1 of the pin member being coincident with the axis of the cylindrical chamber of the hub member. The bushing 8 of each hub member is accordingly disposed intermediate the pin member 2 and the cylindrical chamber for facilitating free rotational movement of each pin member 2 about its axis 1 relative to its associated hub member 6.

Each hub member 6 is connected to an adjacent hub member by a hub link component 3. Each hub link component 3 includes a pair of parallel, spaced outer link elements 5 each extending transverse to the axis 1 of the cylindrical pins 2. Each outer link component 5 extends in encircling relation about the circumference of each hub member 6 to which it is connected.

Each pin member 2 is interconnected to an adjacent pin member by a pin link component 4. Each pin link component 4 includes a pair of parallel, spaced outer link elements 7 each extending transverse to the axes 1 of the pin members 2. Each outer link component 7 extends in encircling relation about the circumference of each pin member 2 which it interconnects. One outer link element 7 of each pin link component 4 supports a conventional web engaging member, schematically illustrated and designated as 12, for engaging one edge portion of a web of textile material. The web engaging member 12 can include, for example, a conventional needle-type element onto which the edge portion of a textile web is impaled. Each pair of the outer link elements 7 of each pin link component 4 are rigidly interconnected to one another and one of the outer link elements 7 is fixedly connected in conventional manner to each one of the pair of pin members 2 interconnected by the pin link component 4. For example, each pin member 2 can be provided with an annular groove positioned axially beyond the hub member 6 in which the pin member is received and one of the outer link elements 7 can be provided with a plate or the like receivable in the annular groove to fixedly secure the pin link member 4 to the respective pin member 2.

The hub link components 3 and the pin link components 4 are arranged in alternating manner with one another. Accordingly, with respect to each hub link component 3 which interconnects a given pair of adjacent hub members 6, a pin link component 4 interconnects a pin member 2 disposed in one of the given pair of hub members 6 with a pin member 2 disposed in the hub member 6 of another pair of interconnected hub members and another pin link component 4 interconnects the pin member 2 of the other hub member of the given pair of hub members 6 with a pin member 2 disposed in yet another pair of interconnected hub members 6. The two pin link components 4 and the hub link components 3 thus move relative to one another through axial rotation of each pin member 2 with respect to its associated hub member 6.

A guide roller means 9 is mounted on each hub member 6 and includes an outer roller element rotatably supported on a ball bearing means 10. The outer roller elements revolve around the axis 1 of each pin member 2 and are received in a conventional roller track (not shown) for supporting the endless chain relative to forces acting thereon generally transverse to the direction of movement of the endless chain. Each ball bearing means 10 includes an inner race concentrically fixedly mounted to the associated hub member 6 and a plurality of ball bearings disposed between the inner race and the outer roller element. The outer roller element is connected to the inner race to provide a sealed enclosure for enclosing the ball bearings. Each hub link component 3 is connected to each one of the respective pair of the hub members 6 which it interconnects at a location intermediate the respective pin link component 4 which is connected to the pin member 2 within the respective hub member and the ball bearing means 10 of the associated guide roller means relative to the axis of the respective hub member.

The outer roller elements revolve about their respective hub member 6 at a relatively high rate. For example, if the rate of travel of the endless chain is in the range of 50 to 200 meters per minute and the outer diameter of the outer roller elements is approximately 8 centimeters, the revolution rate of the outer roller elements is relatively significant and correspondingly frequent lubrication of the ball bearing means 10 must be provided. The endless chain thus includes lubrication conduit means for introducing lubricant to the ball bearing means 10 of each guide roller means. Each lubrication conduit means includes a conduit 13. Each conduit 13 is formed by a throughbore 14 formed in a selected one of the hub link component 3 and the pin link component 4 associated with the respective hub member 6 and opening into the ball bearing means 10. The throughbore 14 is preferably formed in one of the outer link elements 5 of the associated hub link components 3 and extends from an opening 18 in the outer surface of the outer link element 5. Each lubrication conduit means further includes an intermediate member 16 disposed axially intermediate the respective hub link component 3 and the guide roller means associated with the respective hub member 6. Each intermediate member 16 is in the form of an annular ring concentrically fixedly mounted to the respective hub member 6 and includes a throughbore 15 extending axially therethrough and aligned with the respective throughbore 14 for communicating the throughbore 14 with the ball bearing means 10.

Each throughbore 14 is preferably formed in the hub link component 3 associated with a given hub member 6 at a location radially outwardly beyond the end of the pin link component 4 associated with the given hub member 6 relative to the axis of the hub member. Accordingly, the throughbore 14 and the bore 15 of each conduit 13 form a generally linear conduit extending from the outer surface of one of the outer link elements 5 of the hub link component 3 to the ball bearing means 10 in a direction generally parallel to the axis of the given hub member 6. Since the throughbore 14 and the bore 15 of each conduit 13 is effectively a continuous linear passage, the introduction of lubricant to each ball bearing means 10 can be efficiently and easily accomplished.

To further facilitate access to a given conduit 13 for introducing lubricant to the associated ball bearing means 10, the conduit 13 can be inclined from the outer surface of the outer link element 5 in which the throughbore 14 is formed to the ball bearing means 10 in the direction toward the respective hub member 6 and inclined away from the other interconnected hub member 6. The angle of inclination of the conduit 13 with respect to the respective hub member 6 towards which it is inclined can be in the range of approximately up to 60° and preferably up to 45°.

An elastomeric closure means 11 is provided to releasably cover each throughbore 14 against the undesired entry of dirt, debris and the like. Each elastomeric closure means 11 is formed of conventional elastomeric material such as, for example, rubber, and includes a pair of spaced throughbores, each throughbore for insertion over one of an adjacent pair of the pin members 2 and the spacing between the throughbores being selected to insure that the elastomeric closure means 11 is slightly stretched between the adjacent pair of the pin members 2. As can be understood, the elastomeric closure means extends over the opening of the associated throughbore 14 of the lubrication conduit means in relatively close superposed disposition with respect to the outer link element 5 in which the throughbore is formed, thereby substantially closing the throughbore 14 against the undesirable entry of dirt, debris and the like. Moreover, the resilient nature of the elastomeric closure means 11 permits a user to readily move the elastomeric closure means clear of the associated throughbore 14 for ready access to the conduit 13 for introducing lubricant therein.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In a traveling web transport assembly of a textile machine of the type having a plurality of web engaging members mountable on an endless chain for movement therewith for engaging one edge portion of a web of textile material, said endless chain comprising:
    a plurality of hub members, each hub member having an open ended cylindrical chamber;
    a plurality of spaced cylindrical pin members, each pin member being disposed in one of said chambers for free rotation therein about the axis of said cylindrical chamber and each pin member projecting beyond the ends of its associated chamber;
    a plurality of spaced pin link components each interconnecting an adjacent pair of pin members;
    a plurality of spaced hub link components alternating with said spaced pin link components and each interconnecting an adjacent pair of hub members;
    guide roller means mounted to each said hub member, each said guide roller means including an outer roller element and a ball bearing means movably supporting said outer roller element on the respective hub member for rotation about the respective chamber axis, the hub link component associated with each respective hub member being connected to the hub member at a location relative to said respective chamber axis intermediate the respective pin link component connected to the associated pin member within said respective chamber and the ball bearing means associated with the respective hub member; and
    lubrication conduit means including a conduit for introducing lubricant to each said ball bearing means, said conduit including a throughbore formed in the hub link component associated with the respective hub member at a radial spacing from the associated pin link member and opening into the ball bearing means of the hub member.

2. In a traveling web transport assembly, the endless chain according to claim 1 and characterized further in that each said throughbore extends transversely with respect to the hub link component.

3. In a traveling web transport assembly, the endless chain according to claim 1 and characterized further in that the hub link component includes a pair of parallel, axially spaced outer link elements and said lubrication conduit means includes an intermediate member disposed between said outer link elements and said ball bearing means, said conduit extending from said throughbore through said intermediate member and opening into said ball bearing means.

4. In a traveling web transport assembly, the endless chain according to claim 1 and characterized further in that each said conduit is inclined from said associated hub link component to said associated ball bearing means toward the associated pin member.

5. In a traveling web transport assembly, the endless chain according to claim 4 and characterized further in that the inclination of each said conduit toward the associated pin member is up to an angle of approximately 60° with respect to the axis of the respective chamber.

6. In a traveling web transport assembly of a textile machine of the type having a plurality of web engaging members mountable on an endless chain for movement therewith for engaging one edge portion of a web of textile material, said endless chain comprising:
    a plurality of hub members, each hub member having an open ended cylindrical chamber;
    a plurality of spaced cylindrical pin members, each pin member being disposed in one of said chambers for free rotation therein about the axis of said cylindrical chamber and each pin member projecting beyond the ends of its associated chamber;

a plurality of spaced pin link components each interconnecting an adjacent pair of pin members;

a plurality of spaced hub link components alternating with said spaced pin link components and each interconnecting an adjacent pair of hub members;

guide roller means mounted to each said hub member, each said guide roller means including an outer roller element and a ball bearing means movably supporting said outer roller element on the respective hub member for rotation about the respective chamber axis, the hub link component associated with each respective hub member being connected to the hub member at a location relative to said respective chamber axis intermediate the respective pin link component connected to the associated pin member within said respective chamber and the ball bearing means associated with the respective hub member; and lubrication conduit means including a conduit for introducing lubricant to each said ball bearing means, said conduit including a throughbore formed in a selected one of the hub link component and the pin link component associated with the respective hub member and opening into the ball bearing means of the hub member; and elastomeric closure means associated with each said lubrication conduit means, each said elastomeric closure means including a pair of spaced throughbores each adapted to receive one pin member of an adjacent pair of pin members and said elastomeric closure means extending between each said adjacent pair of pin members in covering relation to the throughbore of the respective lubrication conduit means.

* * * * *